United States Patent
Wissenbach et al.

[11] Patent Number: 5,902,420
[45] Date of Patent: May 11, 1999

[54] PROCESS AND DEVICE FOR INCREASING THE DEGREE OF ABSORPTION DURING SUPERFICIAL SOLID PHASE HARDENING OF WORKPIECES BY LASER RADIATION

[75] Inventors: Konrad Wissenbach, Würselen; Ralf Jung, Aachen, both of Germany; Frank Küpper, Belleville, Mich.; Gilbert Vitr, Aachen, Germany

[73] Assignee: Fraunhofer-Gesellschaft Zur Foerderung Der Angewandten Forschung E.V., Munich, Germany

[21] Appl. No.: 08/913,499
[22] PCT Filed: Nov. 21, 1995
[86] PCT No.: PCT/EP95/04581
  § 371 Date: Oct. 17, 1997
  § 102(e) Date: Oct. 17, 1997
[87] PCT Pub. No.: WO96/28574
  PCT Pub. Date: Sep. 19, 1996

[30] Foreign Application Priority Data

Mar. 13, 1995 [DE] Germany .............................. 195 08 584

[51] Int. Cl.$^6$ ........................................................ C21D 1/76
[52] U.S. Cl. ............................ 148/525; 148/565; 266/251
[58] Field of Search ................................... 148/525, 565; 266/251

[56] References Cited

FOREIGN PATENT DOCUMENTS

| 2940127 | 4/1980 | Germany . |
| 4320408 | 12/1994 | Germany . |
| 4401697 | 8/1995 | Germany . |
| 19508584 | 2/1996 | Germany . |
| 63-293113 | 11/1988 | Japan ....................... 148/565 |
| 81852 | 11/1979 | Luxembourg . |
| WO8905707 | 6/1989 | WIPO . |

*Primary Examiner*—Deborah Yee
*Attorney, Agent, or Firm*—Milde Hoffberg & Macklin, LLP

[57] ABSTRACT

In order to harden the surface of workpieces having complex shapes without previously applying absorption promoting surface layers, a mixture of inert gas and oxygen are supplied to the processing zone while the workpiece is exposed to laser radiation. The degree of absorption is maximized by adjusting at least one of the mixing ratio, the volume flow rate, and the processing temperature to conform to a nominal value.

17 Claims, 1 Drawing Sheet

PROCESS AND DEVICE FOR INCREASING THE DEGREE OF ABSORPTION DURING SUPERFICIAL SOLID PHASE HARDENING OF WORKPIECES BY LASER RADIATION

BACKGROUND OF THE INVENTION

The present invention pertains to a method for increasing the degree of absorption during the solid-phase surface hardening of workpieces, especially of geometrically complicated workpieces, by means of laser radiation, in which measures which increase the degree to which the laser radiation is absorbed are taken on the workpiece during the course of the process in the area of the processing zone.

The invention also pertains to an apparatus for increasing the degree of absorption during the solid-phase surface hardening of workpieces, especially of geometrically complicated workpieces, by means of laser radiation, this apparatus being provided with a process gas feed device.

In the processing of materials, e.g., in the surface treatment of structural components, lasers have become well established and are being used in many different areas for a wide range of applications. When laser systems are used, the result of the treatment depends strongly on how much of the laser's power can actually be transferred to the workpiece. The amount of power which can be transferred depends in turn on the degree of absorption at the surface of the workpiece, which itself depends on various factors.

One of the areas of the surface treatment of workpieces is solid-phase hardening with laser radiation. A hardening process of this type is carried out especially on the areas of a workpiece which are subjected, for example, to increased loads or to severe wear or which must withstand elevated temperatures.

By means of the processes used so far for solid-phase hardening of ferrous materials with $CO_2$ or Nd-YAG laser radiation, the degrees of absorption which can be achieved without additional measures are 10% at a wavelength of $\lambda=10.6\,\mu m$ and 30% at $\lambda=1.06\,\mu m$. The degree of absorption and thus the efficiency of the process, $\eta_p P_{abs}/P_W$, where $P_{abs}$ is the amount of laser power absorbed and $P_W$ is the laser power applied to the workpiece, can be increased only by the use of additional, preparatory work steps. These include the application of absorption-increasing coatings such as graphite or paint to the surface. Because a surface treatment of this type must be carried out in highly defined areas, that is, in the areas which meet the industrial requirements, such absorption-increasing coatings must be applied to the workpiece surface in a highly defined manner with respect to, first, their location and, second, with respect to their uniformity of thickness and homogeneity. For this purpose, spraying or rolling methods can be used, but these involve considerable difficulty when the geometry of the workpiece is complicated. The result is therefore a low degree of reproducibility with respect to the application of the coating, especially with respect to the thickness of the layer and its homogeneity, which leads in turn to unsatisfactory processing results. Reproducibility in this sense, however, is mandatory precisely in the mass production of structural components. In addition, production costs are increased by the additional work step of applying the absorption-increasing coatings before the treatment with laser radiation and by the need to remove the residues of these coatings from the surface after the treatment. To prevent oxidation, nitrogen ($N_2$) is used as a shielding gas according to the state of the art.

SUMMARY OF THE INVENTION

According to the invention the surface hardening of complicated component geometries in the finished state can be accomplished without the previous application of absorption-increasing coatings; A processing speed faster than that of conventional methods can be achieved; and the effective hardening depths can be increased under the comparable process parameters.

A process gas, in the form of a gas mixture consisting of at least one inert gas and oxygen, is supplied as an absorption-increasing measure to the processing zone. The degree to which the laser radiation is absorbed in the processing zone of the workpiece is adjusted as a function of a specified nominal value by variation of the mixing ratio of the gas mixture used as process gas and/or of the process gas volume flow rate and/or of the temperature in the processing zone during the course of the process.

In a corresponding apparatus, the process gas feed device supplies a gas mixture consisting of at least one inert gas and oxygen, the mixing ratio and/or volume flow rate of which can be adjusted by a gas mixing device and an automatic controller.

Supplying a process gas consisting of an inert gas-oxygen mixture to defined areas of the workpiece in an on-line process has the result of forming a defined, uniform, and reproducible oxide layer on the surface of the processing zone, and thus the degree to which the laser radiation is absorbed is increased. To produce these oxide layers during solid-phase hardening, the process gas mixture, preferably nitrogen and oxygen, is adjusted in such a way that, depending on the set of requirements and the workpiece geometry, a nominal value for the absorption of the laser radiation is obtained by variation of the mixing ratio of the gas mixture and/or of the process gas volume flow rate and/or of the temperature in the processing zone during the course of the process. By means of nozzles, a process gas mixture of this type can be applied in a highly defined manner to the areas of the workpiece surface to be hardened. The oxide layer is produced by the process gas mixture under the control of the process parameters, such as, for example, the relative motion between the workpiece and the laser beam under simultaneous temperature control in such a way that the oxide layer adjusts the degree of absorption to the set of requirements. By means of the indicated procedure, oxide layer thicknesses of $\leq 1\,\mu m$ can be obtained, which have the effect of increasing the degree of absorption of the laser radiation to as much as 80%. The time-consuming steps of applying coatings and removing their residues associated with the conventional methods are eliminated. By means of the method described, it is possible to increase the effective hardening depth by a factor of 3–4 in comparison with hardening treatments without the benefit of an oxide layer, under otherwise identical process parameters, such as, for example, the laser power input and the feed rate. For the same effective hardening depth, the process speeds which can be achieved with an oxide layer are 3–4 times faster than those without. In addition, it is possible with the method according to the invention to treat complicated component geometries, to which it would be extremely difficult if not impossible in any other way to apply absorption-increasing coatings in the finished state of the component before the laser radiation treatment. Precisely with respect to such complicated components, no post-treatments are required, such as those with the goal of removing residues of the coatings. In the case of complicated components, it is difficult or impossible to remove such residues in undercut areas, except by the use of cumbersome procedures.

To be able to adjust the nominal value setting to accommodate a change in the conditions along the processing zone, such as to a change in the specified workpiece dimensions, it is useful to be able to control automatically or to adjust the nominal value settings along the processing zone. In this way, it is possible, for example, to reset the nominal values and thus to adapt them in an on-line process to changes in the workpiece conditions. The actual values, preferably the temperature, are detected, and these actual values are compared with the nominal values; when there is a deviation, the difference is then corrected. Measuring the temperature makes it possible, especially in conjunction with a pyrometer, to detect the actual state in the area of the workpiece surface subjected to the laser radiation without the need for actual physical contact. A temperature measurement of this type can be accomplished at a relatively great distance from the workpiece, which means that the measurement does not interfere with the course of processing. As another controlled variable, it is possible to measure the mixing ratio of the gas mixture, that is, the ratio of the amount of inert gas to the amount of oxygen, and to compare this actual value with the nominal value. In the event of a deviation from the nominal value, the difference is corrected. A procedure such as this should also be used by preference when a situation exists in which the geometry of the workpiece is subjected to change.

Because of the above-described individual possibilities of detecting an actual value, the process can be adapted individually to the workpiece geometry. On the basis of these actual value/nominal value comparisons, the difference which occurs in the event of a deviation is preferably corrected by a change in the laser power and/or in the processing speed and/or in the beam geometry until the specified nominal value is reached.

It is also advantageous to conduct the gas mixture onto the processing zones of the workpiece at various, changing angles. As a result, it becomes possible, for example, to treat surface areas of different sizes on the work piece surface with the process gas mixture without changing the geometry of the jet nozzle, through which the process gas emerges.

In correspondence with the procedures described above for detecting possible actual values, so that these actual values can be compared with the specified nominal values, temperature measuring devices, flow rate measuring devices, and gas mixing devices are provided as part of the apparatus so that the process parameters cam be adjusted in an appropriate manner.

The gas mixing device should have one or more nozzles, which are directed at different angles onto the workpiece. These different nozzles can also be operated or cut off from the gas feed in correspondence with the workpiece geometry in order thus to treat different areas with process gas. So that the apparatus can be operated with even greater flexibility, the nozzles can also be designed with variable settings; thus an arrangement is created which can be adjusted individually to new series of workpieces or, in an on-line process, to the workpiece being processed at that specific moment. For flexibility in an on-line process, an adjusting device driven by a controller is advantageous. Additional forms of adaptation, furthermore, can be achieved by using different nozzle geometries, nozzle fields, or nozzle arrays, which are positioned individually relative to the workpiece.

DETAILED DESCRIPTION OF THE PREFERRED EMBODIMENT

Figure 1:
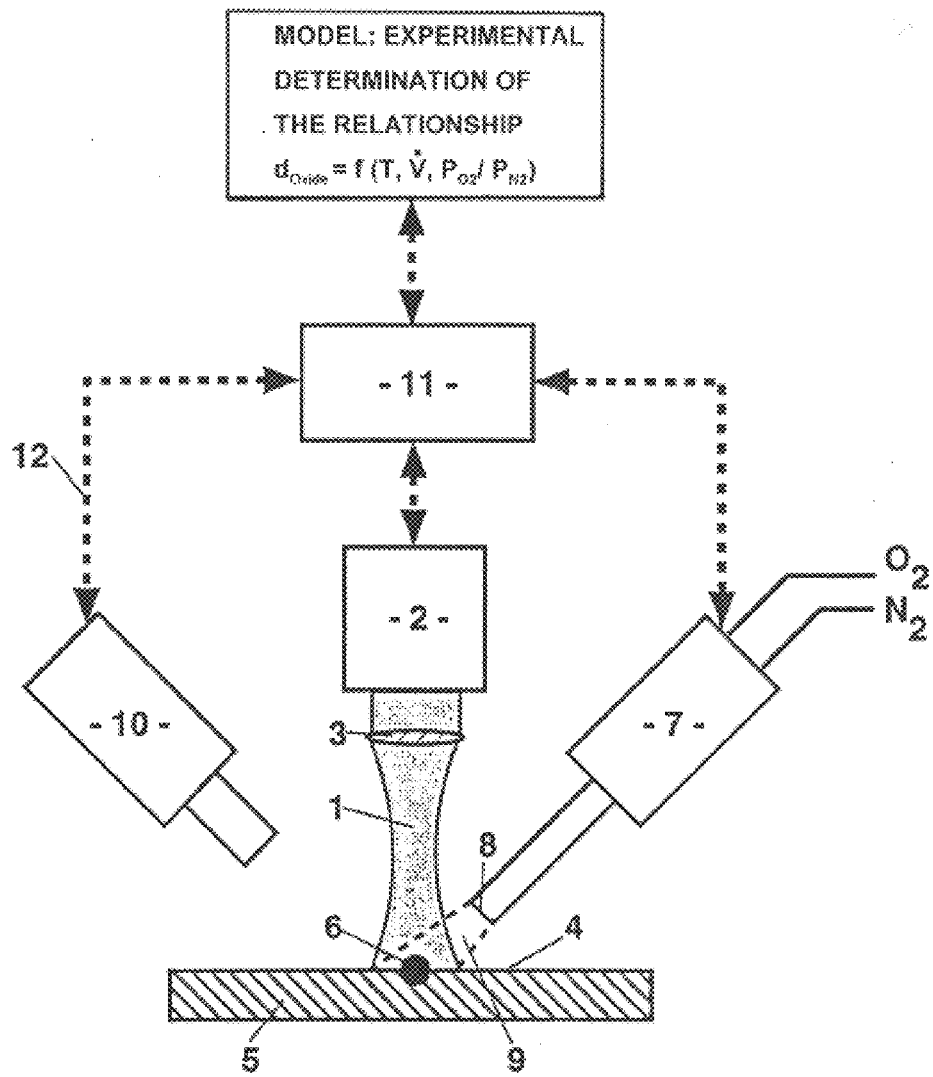
FIG. 1, shows a schematic diagram of an apparatus.

In an arrangement such as that illustrated in FIG. 1, a continuous or pulsed laser beam 1 is directed by a focusing lens 3 onto a surface 4 of a workpiece 5. Focusing lens 3 can be used to adjust the width of the beam to obtain the desired width of the track traced on workpiece surface 4. It should be noted that workpiece 5 is illustrated as a flat plate in FIG. 1, but the apparatus according to the invention and the method according to the invention are especially suitable for complicated component geometries. For these components, appropriate optical devices will then be inserted in the path of laser beam 1 to guide the laser beam. A gas mixture of oxygen ($O_2$) and nitrogen ($N_2$), mixed in a gas mixer 7, is supplied through a nozzle 8 to a processing zone 6 affected by the laser radiation. Cone 9 of the jet, which the gas mixture of nitrogen and oxygen forms as it emerges from the nozzle, can be adjusted by an appropriate device. In addition, the gas mixture, i.e., the mixing ratio, of nitrogen and oxygen, the gas pressure, and the gas flow rate can also be adjusted by way of gas mixer 7. On the surface of the work piece, a uniform oxide layer is thus produced, by which the absorption of the laser radiation can be increased. A pyrometer 10, directed at the workpiece surface exposed to the laser radiation, detects the temperature, which is a function of the amount of laser radiation being absorbed. This temperature is sent as an actual value over a line 12 to a controller 11, where the relationship (between the controlled variable and the temperature T, the gas volume flow rate dV/dt, and the gas mixture $P_{O2}/P_{N2}$ (partial pressure) is taken into account within the context of a model. "Within the context of a model" means that empirical values for certain material data are determined beforehand and stored as fixed values in controller 10; these values are then called up as a function of the specified nominal values with which the process of surface hardening is to be conducted and used to determine the values for the laser power, the gas volume flow rate, and the gas mixture, so that the effective hardening depth can be varied through the adjustment of the degree of absorption. By varying the flow rate of the gas, the gas mixture, and the cross section of the laser beam on workpiece surface 4, it is also possible to vary the manner in which surface hardening is carried out on complicated geometries, such as in the areas of inside and outside edges.

By means of the present process, oxide layers with a thickness of $\leq 1$ μm can be produced, thus simultaneously increasing the absorption to as much as 80%. The surface roughness of the laser-treated workpiece is on the same order of magnitude of that existing prior to the laser treatment, which means that no post-treatment is required.

The resulting oxide layer produced by the method described above is shown in FIG. 2 (material: C60). The figure shows the surface of a test piece, which was fractured after the treatment with laser radiation, as seen by a scanning-electron microscope. At the edge of the fracture, it can be clearly seen that the oxide layer has a thickness of about 1 μm.

Figure 2:
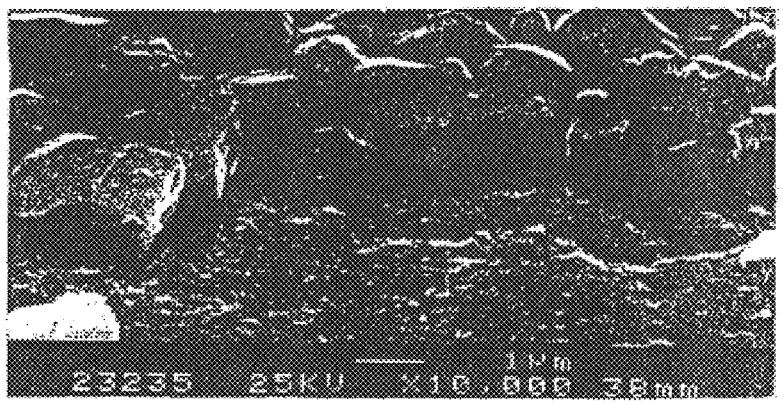
FIG. 2, shows a transverse section through an oxide layer produced in accordance with the process of the invention.

Typical process parameters by means of which oxide layers like that shown in FIG. 2 can be produced are as follows:

| | |
|---|---|
| mean laser power at the processing site | $P_W$ = 350 W; |
| diameter of beam on the workpiece | $d_{w,u}$ = 4 mm; |
| feed rate | $V_v$ = 150 mm/min; |
| inside diameter of nozzle | $d_D$ = 13 mm; |
| nitrogen volume flow rate | $V_{N2}$ = 15 L/min; |
| oxygen volume flow rate | $V_{O2}$ = 0.12 L/min; and |
| thickness of the oxide layer | $d_{Ox}$ = 1 μm. |

We claim:

1. Method for increasing the degree of absorption during solid-phase surface hardening of workpieces, especially of geometrically complicated workpieces, by means of laser radiation, in which measures affecting the workpiece are taken in the area of the processing zone during the course of processing to increase the amount of laser radiation which is absorbed, characterized in that, as an absorption-increasing measure, a process gas in the form of a gas mixture consisting of at least one inert gas and oxygen is supplied to the processing zone, and in that the degree to which the laser radiation is absorbed in the processing zone of the workpiece is adjusted to a nominal value during the course of processing by variation of the mixing ratio of the process gas mixture and/or by varying the volume flow rate of the process gas and/or by varying the temperature in the processing zone.

2. Method according to claim 1, characterized in that, during the course of processing, the specified nominal value is automatically controlled along the processing zone.

3. Method according to claim 1, characterized in that the temperature in the processing zone is detected as an actual value, and in that this actual value is compared with the nominal value, and in that the difference is corrected if there is a deviation.

4. Method according to claim 1, characterized in that the process gas volume flow rate is detected as an actual value, in that this actual value is compared with the nominal value, and in that the difference is corrected if there is a deviation.

5. Method according to one of claim 1, characterized in that, if there is a deviation, the laser power and/or the processing speed and/or the beam geometry is adjusted.

6. Method according to claim 1, characterized in that the gas mixture is supplied at various angles to the processing zone of the workpiece.

7. Method according to claim 1, characterized in that the pattern of the flow of process gas directed against the workpiece is adjusted.

8. Apparatus for increasing the degree of absorption during solid-phase surface hardening of workpieces, especially of geometrically complicated workpieces, by means of laser radiation, with a process gas feed device, characterized in that the process gas feed device (7, 8) supplies a gas mixture consisting of at least one inert gas and oxygen, the mixing ratio and/or volume flow rate of which can be adjusted by way of a gas mixing device (7) and an automatic controller (11).

9. Apparatus according to claim 8, characterized in that the automatic controller (11) accepts, as actual values, measurements of the mixing ratio of the gas mixture and/or of the process gas volume flow rate and/or of the temperature.

10. Apparatus according to claim 9, characterized in that a temperature measuring device is provided to record actual values.

11. Apparatus according to claim 8, characterized in that a flowmeter is provided.

12. Apparatus according to claim 8, characterized in that the gas mixing device (7) has one or more discharge nozzles (8), through which the process gas can be directed at various angles onto the processing zone (6) of the workpiece (5).

13. Apparatus according to claim 12, characterized in that the angular orientation of the discharge nozzles (8) with respect to the workpiece (5) can be changed.

14. Apparatus according to claim 13, characterized in that the change in the angular orientation is accomplished by an adjusting device, which is driven by the automatic controller (11).

15. Apparatus according to claim 12, characterized in that the nozzles (8) have different nozzle geometries.

16. Apparatus according to claim 12, characterized in that a nozzle field or a nozzle array is positioned relative to the workpiece.

17. Method for surface hardening a workpiece, said method comprising placing a workpiece in a processing zone, supplying a mixture of at least one inert gas and oxygen to said processing zone, said mixture having a mixing ratio and being supplied at a volume flow rate, said processing zone being maintained at a temperature, determining a nominal value of said at least one of said mixing ratio, said volume flow rate, and said temperature, said nominal value being based on desired absorption of laser radiation by said workpiece, detecting an actual value of at least one of said mixing ratio, said volume flow rate, and said temperature, adjusting said actual value to agree with the corresponding nominal value, and exposing said workpiece to laser radiation, whereby, the desired absorption of laser radiation by said workpiece is achieved.

* * * * *